US010783010B2

(12) United States Patent
Oliveros et al.

(10) Patent No.: US 10,783,010 B2
(45) Date of Patent: Sep. 22, 2020

(54) OFFLINE BRIEFCASE SYNCHRONIZATION (71) Applicant: salesforce.com, inc., San Francisco, CA (US)

(72) Inventors: Victor Oliveros, San Francisco, CA (US); Gautam Shivnani, Santa Clara, CA (US); David Klein, San Francisco, CA (US); Christopher Douglas Seymour, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/266,783

(22) Filed: Feb. 4, 2019

(65) Prior Publication Data

US 2020/0097334 A1 Mar. 26, 2020

Related U.S. Application Data (60) Provisional application No. 62/735,499, filed on Sep. 24, 2018.

(51) Int. Cl.
*G06F 9/52* (2006.01)
*G06F 16/903* (2019.01)
*G06F 1/3206* (2019.01)
*G06F 9/54* (2006.01)

(52) U.S. Cl.
CPC .............. *G06F 9/52* (2013.01); *G06F 1/3206* (2013.01); *G06F 9/542* (2013.01); *G06F 16/90335* (2019.01)

(58) Field of Classification Search
CPC .... G06F 1/3206; G06F 16/90335; G06F 9/52; G06F 9/542

USPC .................................................. 717/168–178
See application file for complete search history.

(56) References Cited

U.S. PATENT DOCUMENTS

| 7,966,426 | B2* | 6/2011 | Smith .................. G06Q 10/107 709/248 |
| 8,245,128 | B1 | 8/2012 | Ahad et al. |
| 8,255,548 | B2* | 8/2012 | Hopkins ............... H04L 41/145 709/229 |
| 8,452,853 | B2* | 5/2013 | Batra ........................ G06F 8/60 709/203 |
| 9,171,049 | B2* | 10/2015 | Hopkins ............... H04L 41/145 |
| 9,355,115 | B2* | 5/2016 | Garcia-Ascanio .......................... H04L 67/1095 |

(Continued)

OTHER PUBLICATIONS

Extended European Search Report directed to related European Application No. 19198706.4, dated Mar. 3, 2020; 12 pages.

(Continued)

*Primary Examiner* — Marina Lee
(74) *Attorney, Agent, or Firm* — Sterne, Kessler, Goldstein & Fox P.L.L.C.

(57) ABSTRACT

Disclosed herein are system, method, and computer program product embodiments for synchronizing an offline briefcase. An embodiment operates by defining an offline briefcase for a user group that is accessible offline at an application. The embodiment detects a change to a component of the offline briefcase. The embodiment sends a push notification to the application based on the detected change to the component. The embodiment receives a synchronization request from the application in response to the sent push notification. The embodiment then sends the changed component to the application based on the synchronization request.

17 Claims, 5 Drawing Sheets

(56) References Cited

U.S. PATENT DOCUMENTS

| | | | | |
|---|---|---|---|---|
| 2003/0233404 A1* | 12/2003 | Hopkins | ............... | H04L 41/145 |
| | | | | 709/203 |
| 2007/0078950 A1* | 4/2007 | Hopkins | ................ | H04L 67/02 |
| | | | | 709/217 |
| 2011/0239011 A1* | 9/2011 | Waris | ..................... | H04W 4/38 |
| | | | | 713/310 |
| 2013/0132463 A1* | 5/2013 | Garcia-Ascanio | .... | G06F 16/178 |
| | | | | 709/203 |
| 2013/0138608 A1* | 5/2013 | Smith | ..................... | G06F 16/27 |
| | | | | 707/610 |
| 2013/0246498 A1* | 9/2013 | Zucknovich | ........ | H04L 67/2842 |
| | | | | 709/201 |
| 2016/0241659 A1* | 8/2016 | Wessendorf | ............ | H04L 67/26 |
| 2017/0053249 A1* | 2/2017 | Tunnell | ................ | H04L 9/3231 |
| 2017/0331915 A1* | 11/2017 | Jann | ................... | H04L 67/2847 |
| 2020/0097334 A1* | 3/2020 | Oliveros | ............... | G06F 1/3206 |

OTHER PUBLICATIONS

Partial European Search Report directed to related European Application No. 19198706.4, dated Nov. 28, 2019; 15 pages.

\* cited by examiner

OFFLINE BRIEFCASE SYNCHRONIZATION

CROSS-REFERENCE TO RELATED APPLICATIONS

The present application claims the benefit of provisional U.S. Patent Application No. 62/735,499, tided "Offline Briefcase Synchronization" and filed on Sep. 24, 2018, which is incorporated herein by reference in its entirety.

BACKGROUND

A user often uses a mobile application running on a mobile device to perform various tasks outside their home and office. For example, a sales representative may use a customer relationship management (CRM) mobile application to manage and analyze customer interactions when traveling between different customer sites. To perform various tasks, a mobile application often needs to retrieve relevant data from a remote server. For example, a CRM mobile application may retrieve particular accounts, contacts, and purchase orders from a remote server. To retrieve the relevant data, a mobile application often needs to establish a connection to the remote server. But often it is not possible to establish a connection to the remote server. A user, however, often still wants to use their mobile application to perform various tasks offline.

To solve this problem, conventional approaches often involve a mobile application synchronizing data at a remote server with the mobile application prior to going offline. A user can then use the mobile application to perform various tasks using the downloaded data. But these conventional approaches suffer from several problems. First, conventional approaches often involve downloading extraneous data that is not needed by the user when offline. Second, conventional approaches often perform the synchronization at a non-optimal time and block user interaction with the mobile application. Third, conventional approaches do not ensure that the mobile application displays the downloaded data the same way online as offline.

BRIEF DESCRIPTION OF THE DRAWINGS

The accompanying drawings are incorporated herein and form a part of the specification.

in the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for synchronizing an application with a remote server for offline access.

Conventional approaches for synchronizing a mobile application with a remote server for offline access suffer from several technological problems. First, conventional approaches often involve a mobile application downloading extraneous data that is not needed by the user when offline. This can unnecessarily increase download time and storage space requirements for the mobile application. Second, conventional approaches often involve the mobile application failing to download highly relevant data that is needed by the user when offline. Third, conventional approaches do not ensure that the mobile application displays the downloaded data the same way online as offline. Finally, conventional approaches often involve the mobile application performing the synchronization at a non-optimal time, and the synchronization blocking user interaction with the mobile application.

Figure 1:
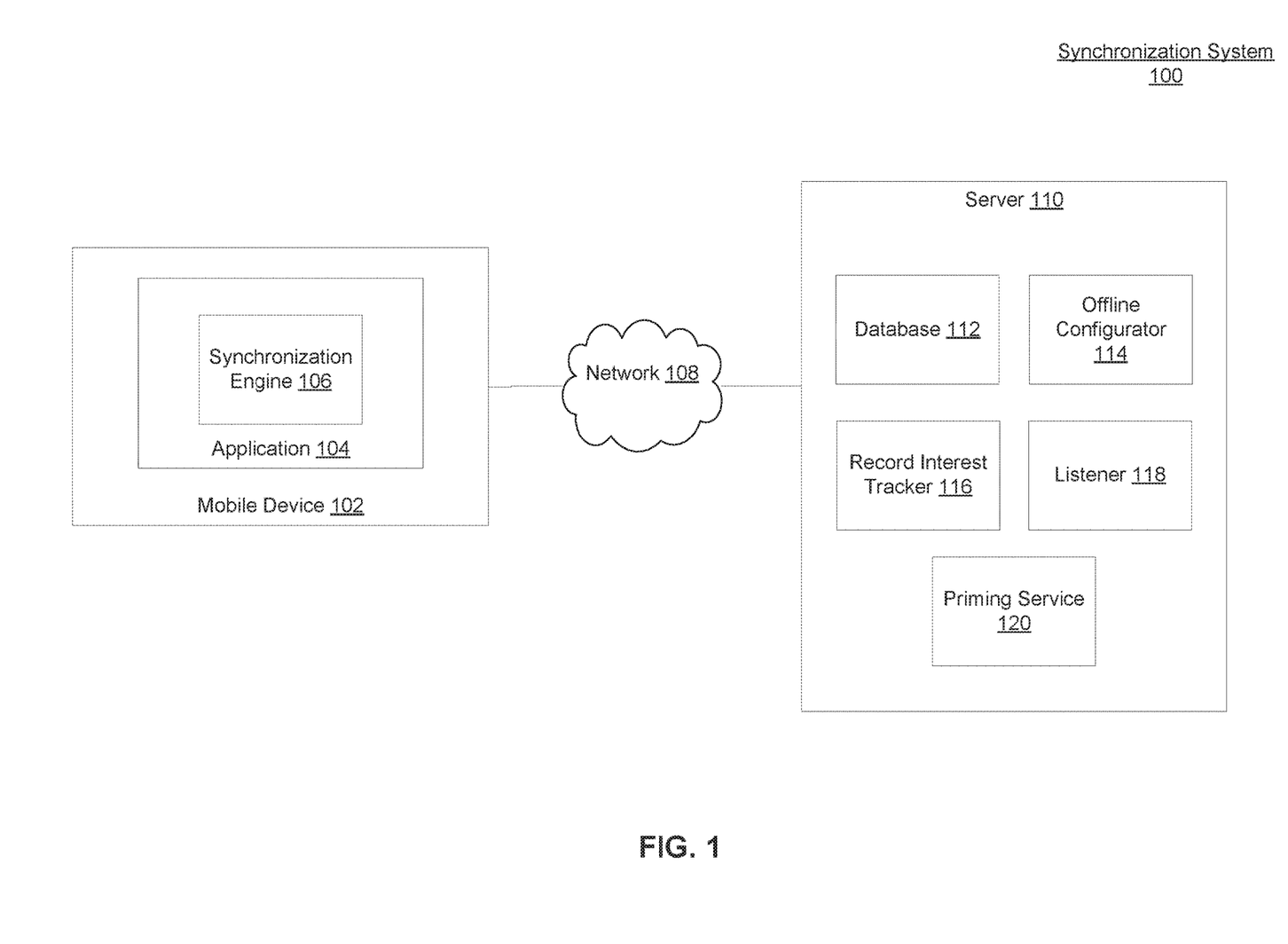
FIG. 1 is a block diagram of a system that synchronizes an offline briefcase, according to some embodiments.

FIG. 1 is a block diagram of a synchronization system 100 that synchronizes an offline briefcase, and solves the above technological problems, according to some embodiments. Synchronization system 100 includes a mobile device 102 and a server 110.

Mobile device 102 can be mobile phone, tablet, smartwatch, laptop, or other electronic device as would be appreciated by person of ordinary skill in the art. Mobile device 102 can include application 104. In some embodiments, application 104 can a mobile application designed to run on mobile device 102. For example, application 104 can be an Apple iOS application, Google Android application, or another type of mobile application as would be appreciated by a person of ordinary skill in the art. In some other embodiments, application 104 can a web application which runs in a web browser on mobile device 102. In some embodiments in which application 104 is a web application, application 104 may store synchronization data in a secure storage area of the web browser.

Application 104 can download and display one or more components from server 110 over network 104. Network 104 can include, without limitation, wired and/or wireless intranet, extranet, Internet, cellular, Bluetooth and/or any other local, short range, ad hoc, regional, global communications network, as well as any combination thereof.

A component is a self-contained, reusable unit of application 104. A component can represent an object and how to display it. For example, a component can represent an object such as an account, contact, opportunity, lead, product, campaign, user, contract, report, or other type of object as would be appreciated by a person of ordinary skill in the art.

A component can include record data and record metadata. Record data can include data about an object. For example, a component can represent a contact and how to display it. The corresponding record data can include the first name, last name, address, telephone number, and email address of the contact. Record data and object can be used interchangeably.

Record metadata can define how to display and interact with a corresponding object. Record metadata can specified using a markup language such, but not limited to, Extensible Markup Language (XML). Record metadata can define what data of the corresponding object to display. Record metadata can define a layout or color scheme to use to display the corresponding object. Record metadata can define one or more images to be displayed with the corresponding object.

Record metadata can also define business logic for the corresponding object. For example, record metadata can define validation rules for the corresponding object. Application 104 can control how a user interacts with a component based on business logic in corresponding record metadata. For example, application 104 can force a user to enter an email address for an object based on a validation rule in the corresponding record metadata.

In some embodiments, application 104 can download and display one or more components from server 110 as a record page. A record page can represent a page in application 104. A record page can display one or more components together in a specific way.

Figure 2:
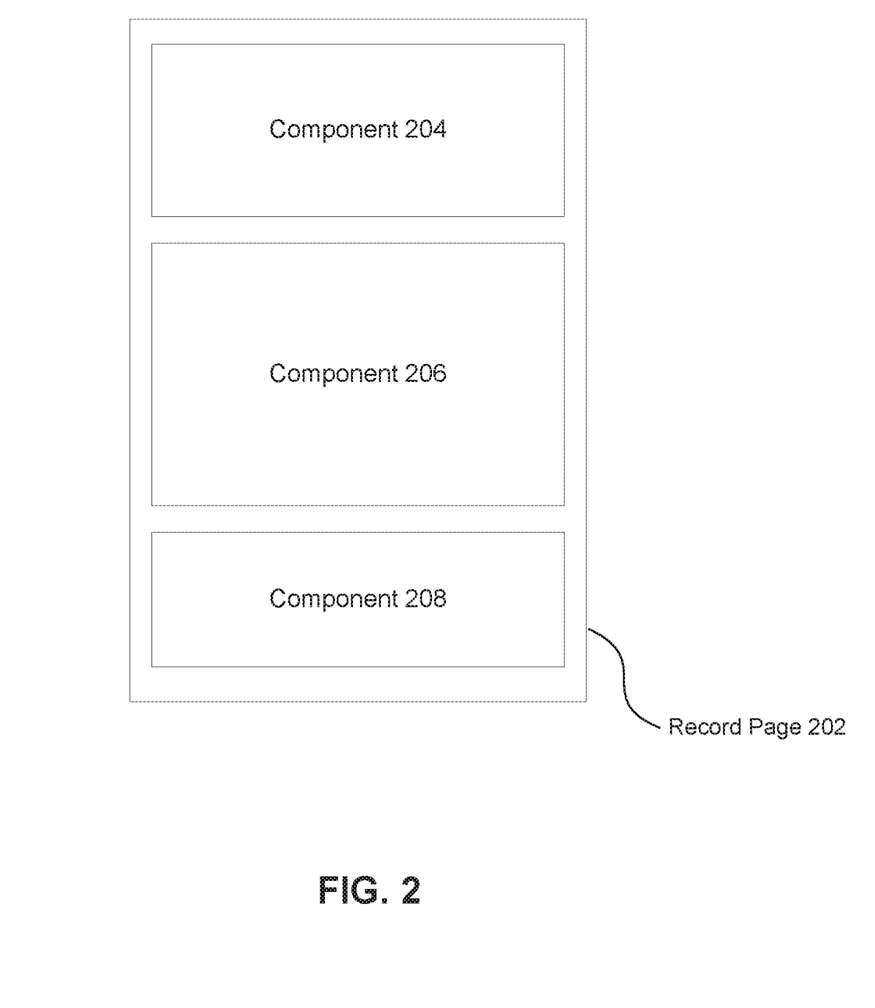
FIG. 2 illustrates example record page of an application, according to some embodiments, according to some embodiments.

FIG. 2 illustrates an example record page of application 104, according to some embodiments. FIG. 2 is discussed with respect to FIG. 1.

FIG. 2 illustrates a record page 202 of application 104. Record page 202 includes components 204, 206, and 208. Application 104 can download and display components 204, 206, and 208 from server 110 over network 104. Components 204, 206, and 208 can each represent an object and how to display it.

For example, if record page 202 of application 104 is record page of a customer relationship management (CRM) application, components 204, 206, 206 can represent CRM objects. For example, component 204 can represent an account object. Component 206 can represent a primary contact for the account object corresponding to component 204. Component 208 can represent a note for the account object corresponding to component 204.

In addition to representing a CRM object, components 204, 206, 206 can define how to display their corresponding objects. For example, component 204 can display the account object at the top of record page 202 using a particular layout. Component 204 can display various information about the account object such as the corresponding account number, account description, and billing address. Component 204 can also display related information. For example, component 204 can display contacts and account orders that are related to the account object.

As discussed, application 104 can download and display one or more components from server 110, Server 110 can include database 112, offline configurator 114, record interest tracker 116, listener 118, and priming service 120. Database 112 can store record data and record metadata associated with the one or more components. Database 112 can be a relational database, a non-relational database, hierarchical database, object-oriented database, or other type of database as would be appreciated by a person of ordinary skill in the art.

Application 104 can be used in online mode or offline mode. In online mode, application 104 can download and display the current versions of one or more components from server 110. For example, application 104 can display a record page containing the most current versions of one or more accounts, contacts, opportunities, leads, products, campaigns, users, contracts, or reports at server 110.

Application 104 can also be used in offline mode. This enables a user of application 104 to perform various tasks offline. Application 104 can be placed in offline mode when mobile device 102 cannot establish a connection to network 108. For example, this can occur when mobile device 102 is out of signal range such as, but not limited to, when mobile device 102 is being used in the mountains. Application 104 can be placed in offline mode because the connection to network 108 is low bandwidth and high latency. Application 104 can be placed in offline mode because server 110 is offline. For example, this may occur when server 110 is down for maintenance. Application 104 can also be placed in offline mode because the cost of using the connection is too expensive. For example, application 104 may be using a cellular connection that is subject to a data quota. Because a user of application 104 may not want to use up their data plan, the user may decide to use application 104 in offline mode.

In offline mode, a user can use application 104 to display and modify one or more components from server 110 even though mobile device 102 does not have a connection to network 108. To use application 104 in offline mode, application 104 can download one or more components from server 110 prior to going offline.

To overcome the technological problem of downloading extraneous data that is not needed by the user when offline, an administrator at server 110 can use offline configurator 114 to define what components will be made available offline at application 104. This can reduce download and storage costs. This can also ensure that a user only gets the components she actually needs.

An administrator at server 110 can use offline configurator 114 to define what components will be made available offline at application 104. The defined set of components can be referred to as an offline briefcase. Once the offline briefcase is downloaded to application 104, a user of application 104 can perform the same tasks on the components in the offline briefcase as they can perform on the components in online mode. Moreover, the use of an offline briefcase solves the technological problem of how to ensure that application 104 displays data the same way online as offline. This is because the components of the offline briefcase describe how to display their associated objects. As a result, application 104 can display objects the same way online as offline.

In some embodiments, an administrator can use offline configurator 114 to define what components will be made available offline based on application. In other words, the administrator can define which application a defined offline briefcase is for. For example, the administrator can define one or more offline briefcases for a first application, and one or more offline briefcases for a second application.

In some embodiments, an administrator can use offline configurator 114 to define one or more components to be made available offline for one or more users. For example, the administrator can indicate that the one or more components are to be made available offline for users A, B, and C. The administrator can specify the one or more users using their corresponding user identifiers, usernames, or other type of identifier as would be appreciated by a person of ordinary skill in the art.

In some other embodiments, an administrator can use offline configurator 114 to define one or more components to be made available offline for a particular user group. For example, the administrator can indicate that one or more components are to be made available offline for the sales team, and another one or more components are to be made available offline for the executive team. The administrator can specify a user group using their corresponding user group identifiers, user group name, or other type of identifier as would be appreciated by a person of ordinary skill in the art.

In some embodiments, an administrator can use offline configurator 114 to define one or more components to be made available offline based on one or more query conditions. For example, an administrator can use offline configurator 114 to define that accounts (e.g., a type of component) in San Francisco having a rating greater than 3 are to be made available offline for the sales team. As would be appreciated by a person of ordinary skill in the art, a query condition can be any condition associated with a field of a component that controls whether the component is to be made available offline.

In some embodiments, offline configurator 114 can automatically add one or more related components to the defined offline briefcase. Offline configurator 114 can automatically add the one or more related components to the defined offline briefcase based on relationships between the components in the offline briefcase and the one or more related components. In some embodiments, the relationships between the components in the offline briefcase and the one or more related components are defined in database 112. In some other embodiments, the relationships between the components in the offline briefcase and the one or more related components can be defined by an administrator using offline configurator 114.

In some embodiments, after an administrator defines an offline briefcase, offline configurator 114 can determine a data size of the offline briefcase (e.g., the one or more components to be made available offline). Offline configurator 114 can provide the determined data size to application 104. This can enable application 104 to control when, and under circumstances, it performs a synchronization of the offline briefcase with server 110.

In some embodiments, after defining the offline briefcase, priming service 120 at server 110 can create an endpoint for accessing and downloading the offline briefcase (e.g., one or more components to be made available offline) from application 104. The endpoint can represent a particular offline briefcase. In other words, the endpoint can represent one or more components to be made available offline for a particular set of users subject to one or more query conditions.

In some embodiments, priming service 120 can implement the endpoint using an application programming interface (API). Priming service 120 can implement the endpoint using a web services API such as, but not limited to, Representational State Transfer (REST). For example, priming service 120 can implement the endpoint as a unique uniform resource locator (URL). Application 104 can access and download the offline briefcase associated with the endpoint by issuing a request to the corresponding URL. In response, priming service 120 can return the offline briefcase using various data formats such as, but not limited to, JavaScript Object Notation (JSON).

In some embodiments, application 104 can issue a request to access and download an offline briefcase associated with an endpoint together with user information (e.g., a user identifier, username, etc.) of the current user of application 104. This can enable application 104 to download only those components of the offline briefcase that have not been previously downloaded to application 104, or those components of the offline briefcase that have been changed since they were downloaded to application 104. This can reduce download time, data transmission cost, and storage space requirements.

To enable application 104 to download only new or changed components in the offline briefcase, server 110 can include record interest tracker 116. Record interest tracker 116 can track for each user which components of an offline briefcase were previously downloaded to application 104. In other words, record interest tracker 116 can track for each user the synchronization status of the components of the offline briefcase. In some embodiments, record interest tracker 116 can track for each user the versions of the components of the offline briefcase that were downloaded to application 104. Record interest tracker 116 can track a version of a component using a version identifier, timestamp, or other identifier as would be appreciated by a person of ordinary skill in the art.

In some embodiments, record interest tracker 116 can establish for each user the initial synchronization status of the one or more components of an offline briefcase after an administrator defines the offline briefcase. Record interest tracker 116 can then track the synchronization status of the components starting from initial synchronization through subsequent synchronization.

An initial synchronization operation can be triggered at application 104 after an administrator defines an offline briefcase, and priming service 120 creates an endpoint representing the offline briefcase. After priming service 120 creates the endpoint, server 110 (e.g., via listener 118) can send a push notification to synchronization engine 106 of application 104. The push notification can cause synchronization engine 106 to schedule a time to perform an initial synchronization operation in the background.

In some embodiments, the push notification can specify the endpoint representing the offline briefcase. The push notification can also specify various other information such as, but not limited to, the data size of the offline briefcase. To perform the synchronization, synchronization engine 106 can issue a synchronization request to the endpoint specified in the push notification. Synchronization engine 106 can also include user information (e.g., a user identifier, username, etc.) of the current user of application 104 together with the synchronization request to the endpoint. In response, priming service 120 can return the offline briefcase associated with the endpoint to application 104. In the case of an initial synchronization, priming server 120 can return the complete offline briefcase to application 104.

In some embodiments, after application 104 performs the initial synchronization with server 110, record interest tracker 116 can update the synchronization status of the one or more components of the offline briefcase for the corresponding user. For example, after the initial synchronization, record interest tracker 116 can mark each component of the offline briefcase for the corresponding user as downloaded or synchronized.

A subsequent synchronization operation can also be triggered at application 104. This may occur after one or more components of the offline briefcase have been modified at server 110. As a result, the corresponding versions of the one or more components at application 104 may be out-of-date.

In some embodiments, when application 104 performs a subsequent synchronization operation, application 104 can download the modified components of the offline briefcase. Application 104 can avoid downloading the unmodified components of the offline briefcase because they have not changed since the last synchronization. In other words, application 104 can download just the changed components during a subsequent synchronization. This can reduce download time, power usage, and storage requirements at mobile device 102.

In some embodiments, record interest tracker 116 can enable application 104 to avoid downloading the unmodified components of the offline briefcase. As discussed, record interest tracker 116 can track the synchronization status of the one or more components of the offline briefcase for each user. Each time a change is made to a component of the offline briefcase at server 110, record interest tracker 116 can change the synchronization status of the component to "not downloaded" or "out-of-date." Record interest tracker 116 can change the synchronization status of the component for each user configured to receive an offline briefcase containing the contract component.

To alert record interest tracker 116 of a change to a component in an offline briefcase, server 110 can include listener 118. Listener 118 can intercept a data change to a component. For example, listener 118 can intercept changes to record data and record metadata associated with the component in database 112.

By way of example, and not limitation, listener 118 can intercept a change to a contact component. For example, the first name and last name of the contact component may have been changed. Listener 118 can then alert record interest tracker 116 that the contract component was changed. In response to the alert, record interest tracker 116 can change the synchronization status of the contract component to "not downloaded" or "out-of-date" for each user configured to receive an offline briefcase containing the contract component.

In some embodiments, in response to listener 118 intercepting a change to a component, and record interest tracker 116 updating the synchronization status of the component for each user configured to receive an offline briefcase containing the component, server 110 can send a push notification to the mobile device 102 of each user. Server 110 can send the push notification to synchronization engine 106 of application 104 at the mobile device 102 of each user. The push notification can cause synchronization engine 106 to schedule a time to perform a subsequent synchronization operation in the background.

A push notification can indicate to synchronization engine 106 that there are new or changed components at server 110 that are not present in an offline briefcase at application 104. Because the push notification can indicate there are new or changed components, synchronization engine 106 can avoid polling server 110 for new or changed components at server 110. This can reduce power usage and data transmission costs at mobile device 102. Synchronization engine 106 can instead wait until it receives a push notification. Synchronization engine 106 can then perform a synchronization at a later time that balances various factors as discussed below.

In some embodiments, synchronization engine 106 can perform the synchronization using information in the push notification. Synchronization engine 106 can perform the synchronization by issuing a synchronization request to the endpoint specified in the push notification. As discussed, the endpoint can represent a particular offline briefcase. Synchronization engine 106 can also include user information (e.g., a user identifier, username, etc.) of the current user of application 104 together with the synchronization request to the endpoint. In response, priming service 120 can return one or more new or changed components of the offline briefcase associated with the endpoint to application 104. As discussed above, server 110 can use record interest tracker 116 and listener 118 to enable the return of the one or more new or changed components of the offline briefcase to application 104.

In some embodiments, synchronization engine 106 can control when to perform a synchronization operation to improve the user experience at application 104 and reduce power usage and data transmission costs at mobile device 102. Synchronization engine 106 can receive a push notification indicating there are new or changed components at server 110 that are not present in an offline briefcase at application 104. The push notification can cause synchronization engine 106 to be woken up to initiate a synchronization operation. The push notification can cause synchronization engine 106 to be woken up even if synchronization engine 106 is not running. For example, the push notification can be received at a mobile operating system (e.g., Apple iOS or Google Android) at mobile device 102. The mobile operation system can then start running synchronization engine 106 in response to the push notification.

In some embodiments, the mobile operating system can decide when to wake up synchronization engine 106 to initiate a synchronization. The mobile operating system can decide to wake up the synchronization engine 106 based on the current battery life of mobile device 102, the presence of a connection to network 108, the type of connection to network 108 (e.g., an Institute of Electrical and Electronics Engineers (IEEE) 802.11 (WiFi) connection versus a cellular network connection), the number of currently running applications on mobile device 102, usage patterns, geolocation, and various other factors as would be appreciated by a person of ordinary skill in the art. The mobile operating system can decide to wake up the synchronization engine 106 by analyzing one or more of these factors using various machine learning capabilities.

In some embodiments, the mobile operating system can decide when to wake up synchronization engine 106 to initiate a synchronization based on various information provided by server 110. The mobile operating system can decide to wake up synchronization engine 106 to initiate a synchronization of an offline briefcase based on a data size of the offline briefcase included in the push notification. For example, the mobile operating system may initiate a synchronization over a cellular connection when the data size of the offline briefcase is less than the data quota balance of the cellular connection. The mobile operating system may initiate a synchronization over a WiFi connection when the data size of the offline briefcase is greater than the data quota balance of the cellular connection.

The mobile operating system can also decide to wake up synchronization engine 106 to initiate a synchronization of an offline briefcase based on a geo fence trigger included in the push notification. For example, the mobile operating system may initiate a synchronization when the mobile device 102 enters the geo fence specified in the push notification. As would be appreciated by a person of ordinary skill in the art, the mobile operating system can decide to wake up synchronization engine 106 to initiate a synchronization based on various other information provided by server 110.

In some embodiments, the mobile operating system can decide to wake up synchronization engine 106 to initiate a synchronization based on both information provided by server 110 and various factors at mobile device 102. As would be appreciated by a person of ordinary skill in the art, the mobile operating system can decide to wake up synchronization engine 106 to initiate a synchronization by analyzing both the information provided by server 110 and the various factors at mobile device 102 using various machine learning capabilities.

In some embodiments, synchronization engine 106 can perform a synchronization silently in the background. Synchronization engine 106 can perform the synchronization without disrupting user workflow. For example, instead of blocking user interaction with application 104 during a synchronization, synchronization engine 106 can perform the synchronization while a user interacts with application 104.

In some embodiments, when in offline mode, application 104 can enable a user to make changes to one or more components in an offline briefcase. For example, a user can edit the first name and last name of a contact represented by a contact component in the offline briefcase.

In some embodiments, application 104 can save changes to a component in the offline briefcase as a draft component. The draft component can contain the version of the data in the downloaded component of the offline briefcase prior to the change, and the corresponding change. This can enable conflict checking as discussed below. The draft component may not contain the original data in the downloaded component of the offline briefcase if it has not been changed. This can reduce a data size of the draft component. The draft component can be stored in various formats such as, but not limited to, JSON. As would be appreciated by a person of ordinary skill in the art, the draft component can be stored using various other formats.

The draft component can be stored in a secure storage area of application 104. In some embodiments, where application 104 is a web application, the draft component can be stored in a secure storage area of the web browser running application 104. As would be appreciated by a person of ordinary skill in the art, there are various ways to implement a secure storage area in application 104 or a web browser.

In some embodiments, during a subsequent synchronization, synchronization engine 106 can upload the draft component to server 110 to replace the corresponding component at server 110. During the synchronization, server 110 may detect a conflict between the uploaded draft component and the corresponding component at server 110. For example, server 110 may determine that the previous version of the data specified by the draft component (e.g., the version of the data in the corresponding component at application 104 prior to the change) does not match the current version of the data stored at server 110. This may indicate that the corresponding component was modified by another user at server 110 when application 104 was in offline mode.

In some embodiments, application 104 can alert the user of the potential conflict. For example, application 104 may indicate that the version of the component corresponding to the draft component on server 110 was changed when application 104 was in offline mode. Application 104 may also display the differences between the version of the component corresponding to the draft component on server 110 and the draft component.

In some embodiments, application 104 can enable the user to proceed with the synchronization and replace the component corresponding to the draft component on server 110 with the draft component. Application 104 can also allow the user to ignore the conflict and not replace the component corresponding to the draft component on server 110 with the draft component.

Figure 3:
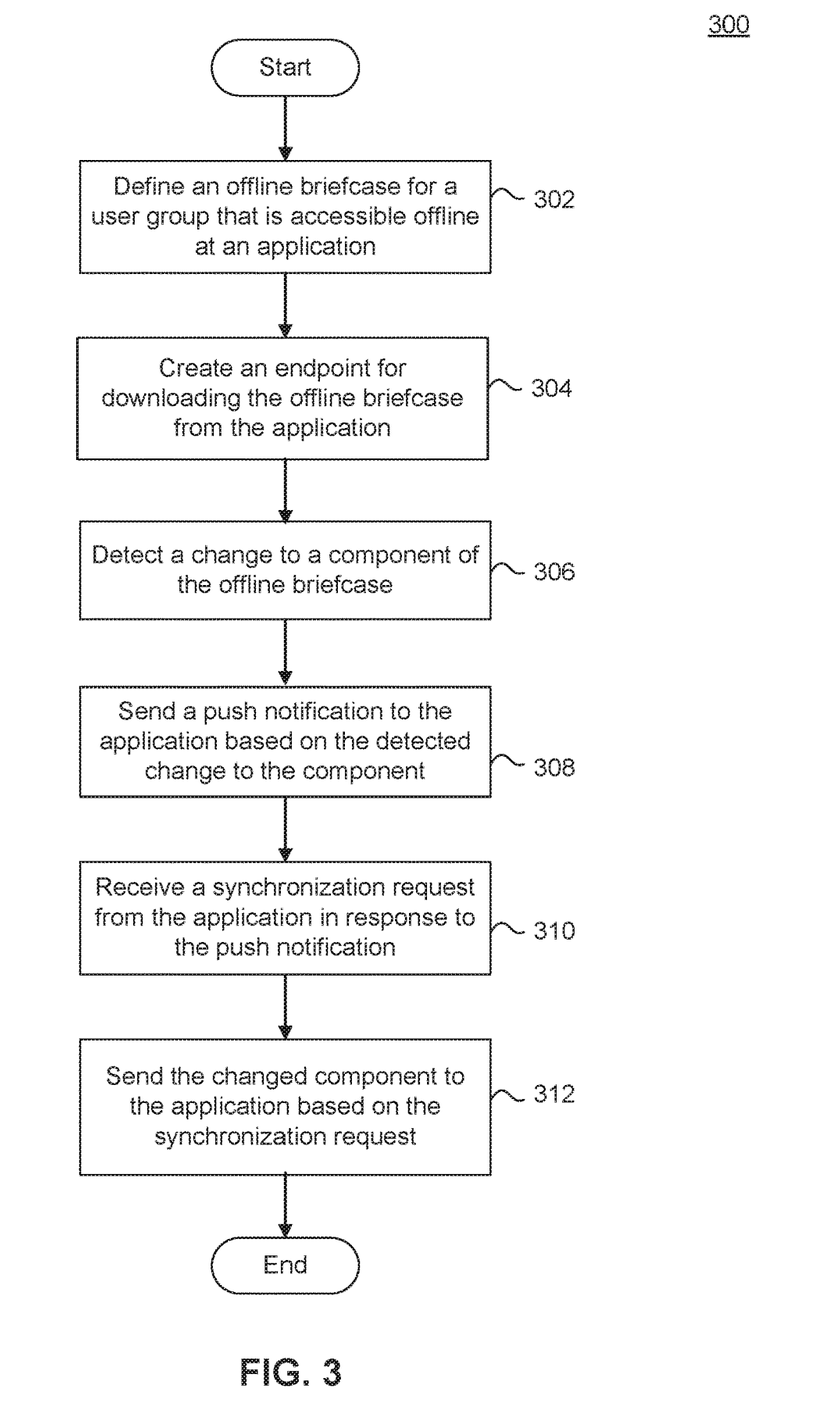
FIG. 3 is a flowchart illustrating a process for synchronizing an offline briefcase, according to some embodiments.

FIG. 3 is a flowchart for a method 300 for synchronizing an offline briefcase, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to those example embodiments.

In 302, an administrator at server 110 uses offline configurator 114 to define what components will be made available offline at application 104 for one or more users. The defined set of components can be referred to as an offline briefcase. A component can represent an object (e.g., an account, contact, opportunity, lead, product, campaign, user, contract, report, etc.) and how to display it.

The administrator can further define what components will be made available offline at application 104 based on one or more query conditions. For example, the administrator can use offline configurator 114 to define that accounts (e.g., a type of component) in San Francisco having a rating greater than 3 are to be made available offline for the one or more users.

In 304, priming service 120 at server 110 creates an endpoint for accessing and downloading the offline briefcase from application 104. The endpoint can represent the offline briefcase (e.g., the one or more components to be made available offline for a particular set of users subject to one or more query conditions). Priming service 120 can implement the endpoint using an API such as, but not limited to, a web services API.

In 306, listener 118 intercepts a data change to a component of the offline briefcase. For example, listener 118 can intercept changes to the record data and record metadata associated with the component in database 112.

In 308, server 110 sends a push notification to synchronization engine 106 of application 104 indicating there has been a change to the component in the offline briefcase. The push notification can contain the endpoint used to download and access the offline briefcase.

In 310, server 110 receives a synchronization request from synchronization engine 106 of application 104 at the created endpoint. The synchronization request can include a user identifier of the user at application 104. Server 110 can use record interest tracker 116 to determine whether the changed component has been already downloaded to application 104 for the user.

In 312, server 110 sends the changed component to synchronization engine 106 of application 104 in response to the synchronization request. Application 104 can then display the changed component to the user. Application 104 can display the record data (e.g., object) of the changed component using the record metadata of the changed component. Because the changed component contains both the record data and record metadata, application 104 can display the changed component the same way online as offline.

As discussed above, an administrator can define an offline briefcase for one or more users so that those users can use application 104 offline. However, a customer may want to create a new user-defined component and run it offline. To do so, the customer can create the new user-defined component and declare it as offline capable. This ensures that the associated records of the user-defined component are also available offline.

Application 104 can include one or more user-defined components. A user-defined component can include one or more records (e.g., components from server 110). Application 104 can process a user-defined component declared offline capable as though it was component made available offline as part of an offline briefcase. For example, a user-defined component can be synchronized using synchronization engine 106 in the same way that a component of an offline briefcase can be synchronized using synchronization engine 106 (e.g., according to method 300). Application 104 can also process for offline use one or more records (e.g., components from server 110) together with the user-defined component itself.

In some embodiments, an administrator can use offline configurator 114 to declare a user-defined component as offline capable. The administrator can further use offline configurator 114 to ensure that any associated records (e.g., components at server 110) of the user-defined component declared offline capable are defined as offline available. Application 104 can then use synchronization engine 106 to prefetch the user-defined component together with any associated records (e.g., components at server 110) of the user-defined component from server 110 prior to switching to offline mode. In response to the prefetching request, application 104 can receive the associated records (e.g., components from server 110) of the user-defined component declared offline capable.

For example, an administrator can use offline configurator 114 to declare a user-defined map component as offline capable. The administrator can further use offline configurator 114 to identify one or more records (e.g., components) to download for the user-defined map component. The administrator can use offline configurator 114 to identify the one or more records for a set of users with a specific job function.

The user-defined map component can display a map. The map can correspond to a particular record (e.g., a component) associated with the user-defined map component. For example, the map may correspond to a particular account. Thus, when a user is using the user-defined map component offline, the user wants the map associated with particular account to be displayable offline.

To display the map associated with particular account offline, application 104 can prefetch the user-defined map component using synchronization engine 106 from server 110 prior to switching to offline mode. Application 104 can also prefetch the associated records of user-defined map component, and the map from the web that corresponds to the particular account.

In some embodiments, a user-defined component can have different layouts per action type. For example, the user-defined component can have separate view and edit layouts. For a user-defined component declared offline capable, application 104 can prefetch the separate layouts for the user-defined component. This can enable a user to have a unique experience for viewing and editing using the user-defined component even while offline. In some embodiments, the separate layouts can be specified in record metadata of the user-defined component.

In some embodiments, application 104 can be a composite of both native elements and web elements. A native element can an element of the underlying mobile operating system or application runtime. For example, a native element can be a search function. A web element can be an element that is rendered in a web container. Both the native elements and web elements may require access to offline records (e.g., components from server 110).

In some embodiments, application 104 can provide a common data caching layer to both the native elements and web elements. The native elements and web elements can access the offline records through the common data caching layer. The common data caching layer can identify data that needs to be available offline and caches that data for use by application 104. The common data caching layer can ensure that an edit to a record is universally available to application 104 regardless of whether it occurred in a native element or web element.

Figure 4:
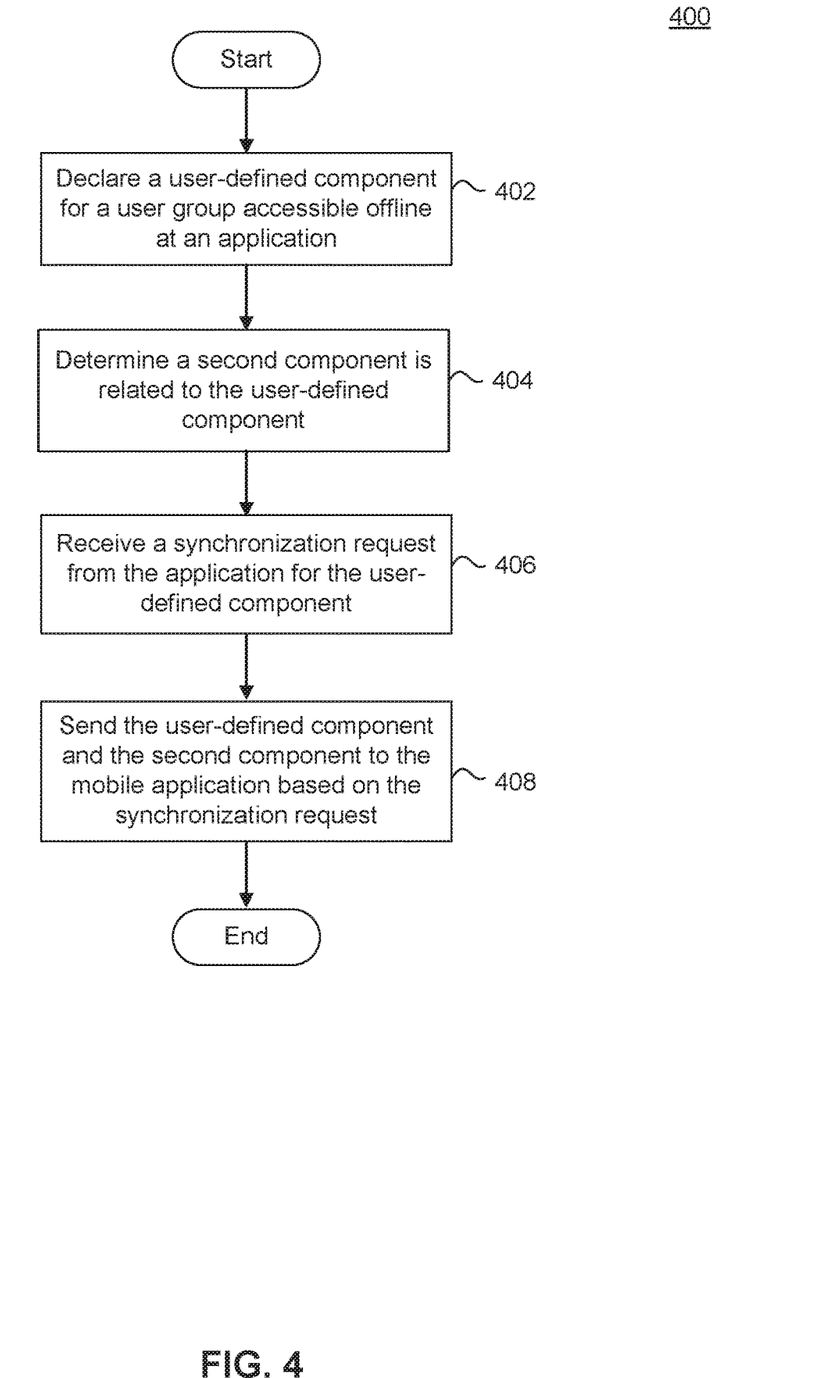
FIG. 4 is a flowchart illustrating a process for synchronizing a user-defined component of an application for offline access, according to some embodiments.

FIG. 4 is a flowchart for a method 400 for synchronizing a user-defined component of application 104 for offline access, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 400 shall be described with reference to FIG. 1. However, method 400 is not limited to those example embodiments.

In 402, an administrator at server 110 uses offline configurator 114 to declare a user-defined component for a user group accessible offline at application 104.

In 404, offline configurator 114 determines that a second component is related to the user-defined component.

In 406, server 110 receives a synchronization request from application 104 for the user-defined component.

In 408, server 110 sends the user-defined component and the second component to the mobile application based on the synchronization request.

Figure 5:
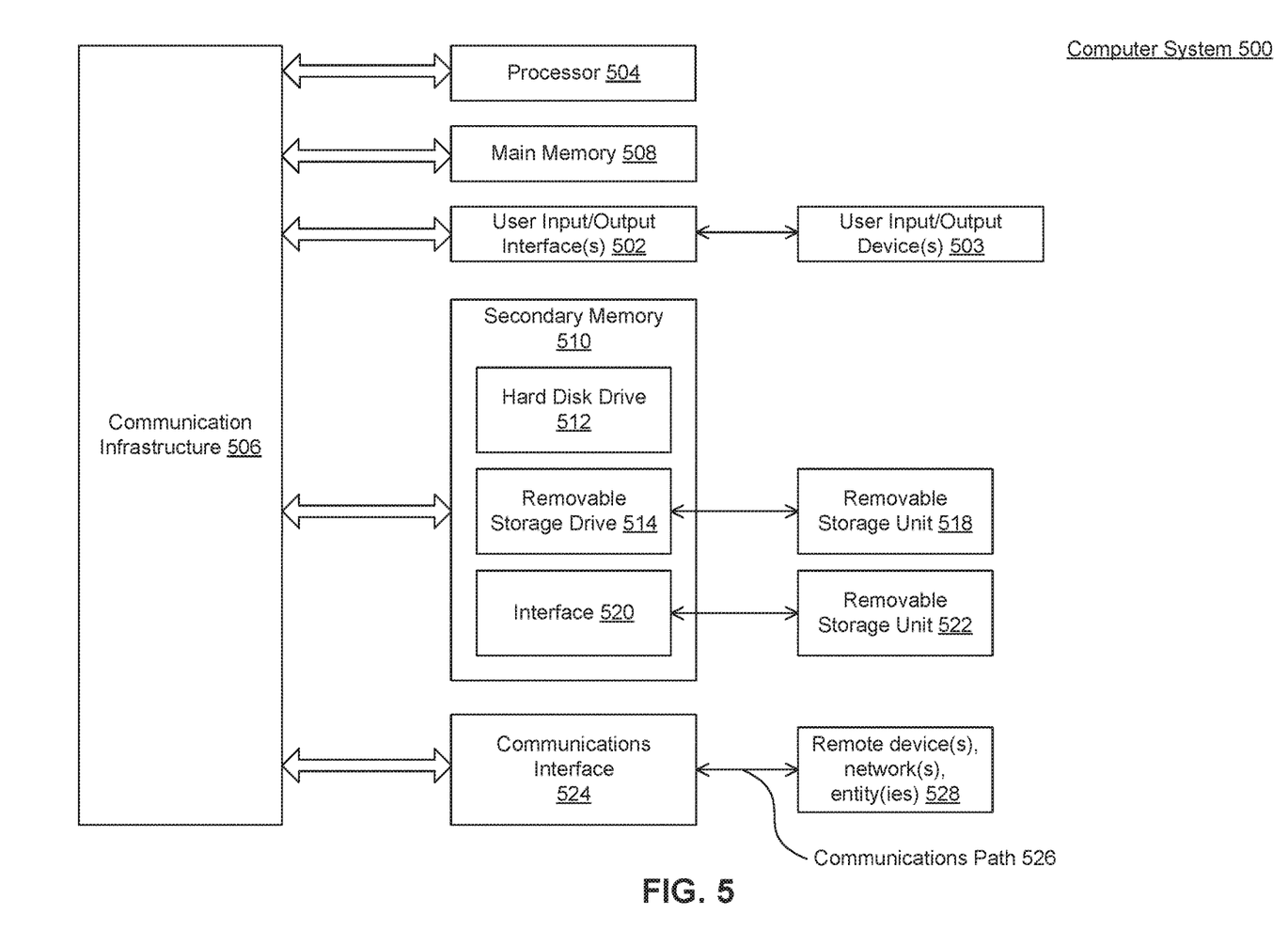
FIG. 5 is an example computer system useful for implementing various embodiments.

Various embodiments can be implemented, for example, using one or more computer systems, such as computer system 500 shown in FIG. 5. Computer system 500 can be used, for example, to implement methods 300 and 400 of FIGS. 3 and 4, respectively. For example, computer system 500 can perform automatic layout of an object. Computer system 500 can further display a presentation across a plurality of electronic devices, according to some embodiments. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

defining, by at least one processor of a host server, an offline briefcase for a user group that is accessible offline at an application operating on a client device, wherein the offline briefcase comprises a component representing an object of the application, the component comprising record data that includes data related to the object and record metadata that includes information defining how to display and interact with the object, and wherein the offline briefcase enables the component to operate offline in a same manner as while operating online;

generating, by the at least one processor, an endpoint for accessing and downloading the offline briefcase, the endpoint representing the offline briefcase and being implemented using an application programming interface (API) that includes a uniform resource locator (URL);

detecting, by the at least one processor, a change to the component;

sending, by the at least one processor, a push notification to the application based on the detected change to the component, the push notification comprising the endpoint;

receiving, by the at least one processor, a synchronization request from the application in response to the sent push notification, the synchronization request being issued to the URL of the endpoint; and sending, by the at least one processor, the changed component to the application based on the synchronization request.

2. The method of claim 1, further comprising:
updating a synchronization status of the component for a user of the user group based on the detected change to the component.

3. The method of claim 1, further comprising:
calculating a data size of the offline briefcase; and
adding the data size to the push notification.

4. The method of claim 1, further comprising:
determining a second component that is related to the component; and
adding the second component to the offline briefcase.

5. The method of claim 1, the defining further comprises:
adding the component to the offline briefcase based on a query condition.

6. The method of claim 1, wherein the synchronization request is received in response to a mobile operating system waking up the application based on the push notification.

7. The method of claim 6, wherein the mobile operating system determines a time to wake up the application based on a connection type, battery level, usage pattern, data quota, or geo fence criteria.

8. A system, comprising:
a memory; and
at least one processor coupled to the memory and configured to:
define an offline briefcase for a user group that is accessible offline at an application operating on a client device, wherein the offline briefcase comprises a component representing an object of the application, the component comprising record data that includes data related to the object and record metadata that includes information defining how to display and interact with the object, and wherein the offline briefcase enables the component to operate offline in a same manner as while online;
generate an endpoint for accessing and downloading the offline briefcase, the endpoint representing the offline briefcase and being implemented using an application programming interface (API) that includes a uniform resource locator (URL);
detect a change to the component;
send a push notification to the application based on the detected change to the component, the push notification comprising the endpoint;
receive a synchronization request from the application in response to the sent push notification, the synchronization request being issued to the URL of the endpoint; and
send the changed component to the application based on the synchronization request.

9. The system of claim 8, the at least one processor further configured to:
update a synchronization status of the component for a user of the user group based on the detected change to the component.

10. The system of claim 8, wherein the at least one processor is further configured to:
determine a second component that is related to the component; and
add the second component to the offline briefcase.

11. The system of claim 8, wherein the at least one processor is further configured to:
add the component to the offline briefcase based on a query condition.

12. The system of claim 8, wherein the synchronization request is received in response to a mobile operating system waking up the application based on the push notification, and wherein the mobile operating system determines a time to wake up the application based on a connection type, battery level, usage pattern, data quota, or geo fence criteria.

13. A non-transitory computer-readable device having instructions stored thereon that, when executed by at least one computing device, causes the at least one computing device to perform operations comprising:
defining an offline briefcase for a user group that is accessible offline at an application operating on a client device, wherein the offline briefcase comprises a component representing an object of the application, the component comprising record data that includes data related to the object and record metadata that includes information defining how to display and interact with the object, and wherein the offline briefcase enables the component to operate offline in a same manner as while online;
generating, by the at least one processor, an endpoint for accessing and downloading the offline briefcase, the endpoint representing the offline briefcase and being implemented using an application programming interface (API) that includes a uniform resource locator (URL);
detecting a change to the component;
sending a push notification to the application based on the detected change to the component, the push notification comprising the endpoint;
receiving a synchronization request from the application in response to the sent push notification, the synchronization request being issued to the URL of the endpoint; and
sending the changed component to the application based on the synchronization request.

14. The non-transitory computer-readable device of claim 13, the operations further comprising:
updating a synchronization status of the component for a user of the user group based on the detected change to the component.

15. The non-transitory computer-readable device of claim 13, the operations further comprising:
determining a second component that is related to the component; and
adding the second component to the offline briefcase.

16. The non-transitory computer-readable device of claim 13, the defining comprising:
adding the component to the offline briefcase based on a query condition.

17. The non-transitory computer-readable device of claim 13, wherein the synchronization request is received in response to a mobile operating system waking up the application based on the push notification, and wherein the mobile operating system determines a time to wake up the application based on a connection type, battery level, usage pattern, data quota, or geo fence criteria.

* * * * *